Nov. 8, 1932.  L. G. KNAPP  1,887,268
AUTOMATIC IGNITION CONTROL FOR EXPLOSIVE ENGINES
Filed April 3, 1928  3 Sheets-Sheet 1
Fig. I.
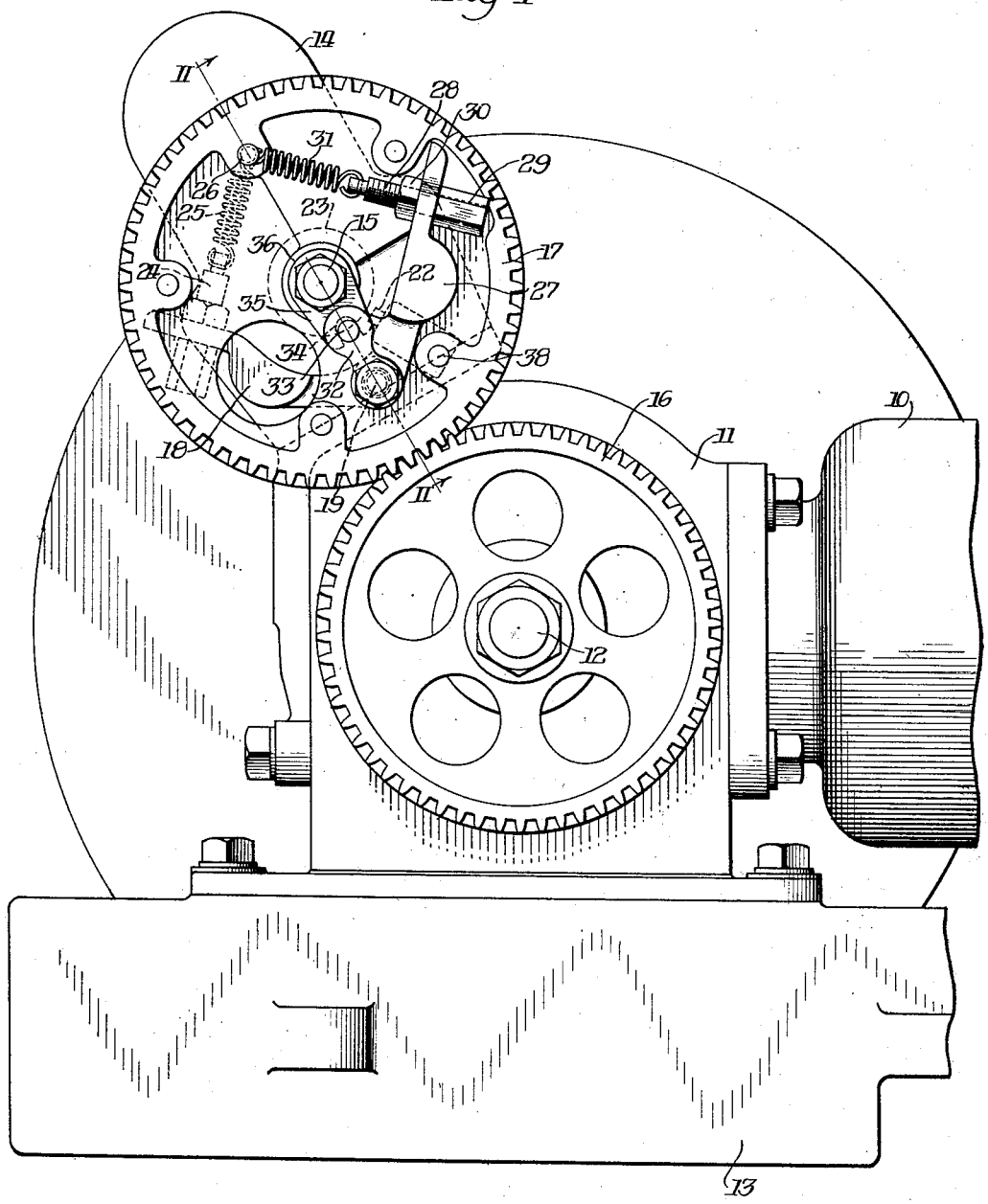
Inventor:
Leland G. Knapp
By
Attys.

Nov. 8, 1932.    L. G. KNAPP    1,887,268
AUTOMATIC IGNITION CONTROL FOR EXPLOSIVE ENGINES
Filed April 3, 1928    3 Sheets-Sheet 2
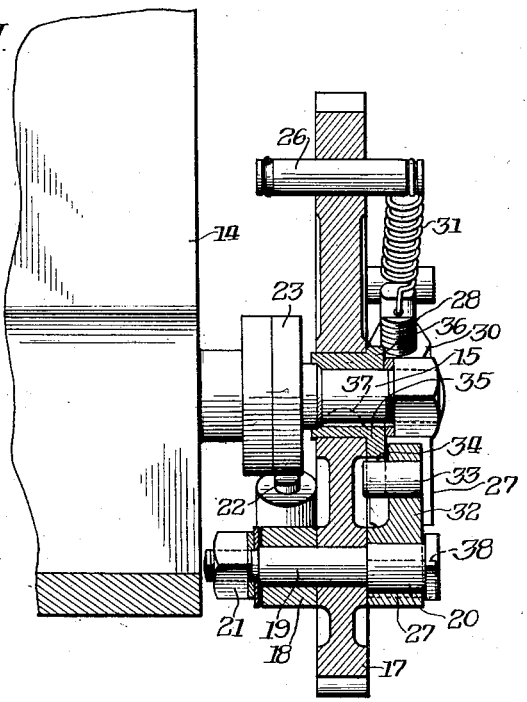
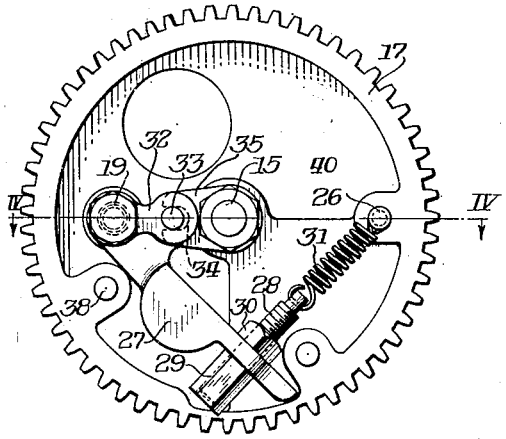
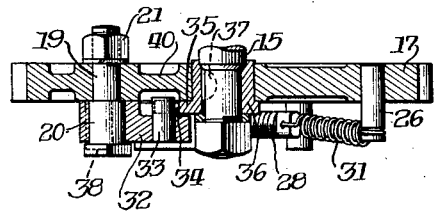
Inventor:
Leland G Knapp.
By
Attys.

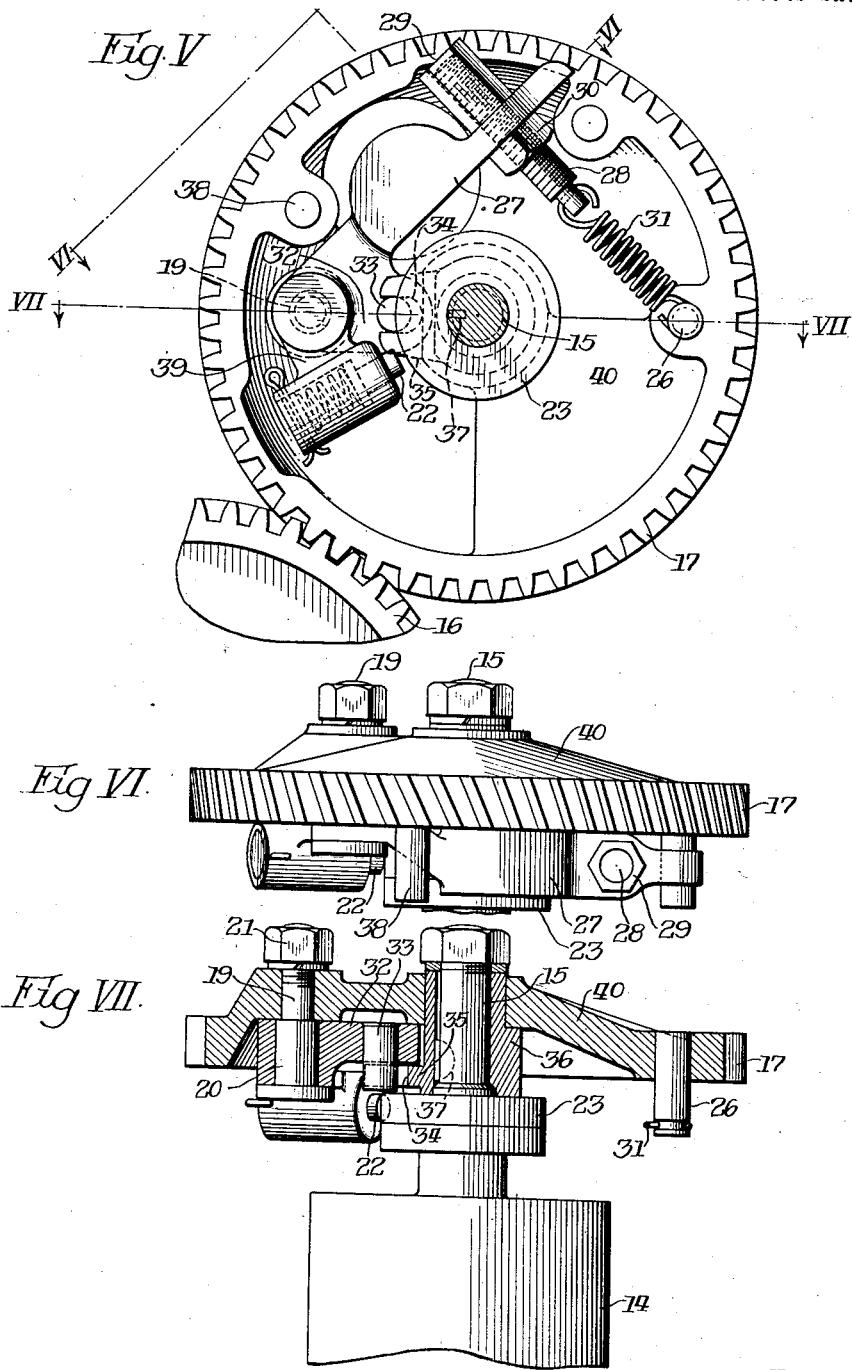

Patented Nov. 8, 1932

1,887,268

UNITED STATES PATENT OFFICE

LELAND G. KNAPP, OF CHICAGO, ILLINOIS, ASSIGNOR TO MONTGOMERY WARD & COMPANY, INC., OF CHICAGO, ILLINOIS, A CORPORATION OF ILLINOIS

AUTOMATIC IGNITION CONTROL FOR EXPLOSIVE ENGINES

Application filed April 3, 1928. Serial No. 267,095.

The present invention is related to explosion or internal combustion engines, and has particular reference to the electrical ignition mechanism thereof.

The object of the invention is the provision of simple and efficient means for automatically controlling the timing of the spark to accord with the speed of the engine, so as to prevent premature explosion of the charge when the engine is operating at reduced speed, and likewise to advance the spark proportionally as the speed of the engine increases until a predetermined angle of advance is reached. The spark thereby is automatically synchronized with the speed of the engine, and whether the latter be operating at high or low speed, the engine is protected against damage and injury.

Other objects and advantages of the improvements will appear as the nature of the same is better understood, the invention consisting substantially in the novel combination and construction of parts, and their arrangement, as hereinafter fully described, illustrated in the accompanying drawings, and finally pointed out in the appended claims.

The invention is susceptible of embodiment in various forms, certain of which are shown herein, so that the present disclosure is to be understood as merely illustrative of the practical adaptation of the invention.

In the drawings:

Fig. 1 is a side elevation of a portion of an explosive engine equipped with automatic controlling mechanism constructed in accordance with the present invention;

Fig. 2 is a transverse sectional view of that mechanism on the line II—II, Fig. 1;

Fig. 3 is a side elevation of another embodiment of the invention;

Fig. 4 is a transverse sectional view on the line IV—IV, Fig. 3;

Fig. 5 is a side elevation of a further embodiment of the invention;

Fig. 6 is an edge elevation of the construction illustrated in Fig. 5, viewed on the line VI—VI; and Fig. 7 is a transverse sectional view on the line VII—VII, Fig. 5.

Referring now in detail to the accompanying drawings, and having reference particularly to Figs. 1 and 2, the numeral 10 designates the cylinder of an explosive engine. This is of the small-power type, but the invention is adapted for incorporation in various types of explosive engines, and that type herein illustrated is merely for illustrative purposes. The engine includes the usual crank case 11, in which is journaled the crank shaft 12, said crank case being bolted or otherwise suitably supported upon a base 13.

The present invention is primarily intended for controlling the ignition effected by the employment of magnetos for generating the requisite current. The numeral 14, therefore, designates a magneto of suitable construction, the armature or rotor shaft being designated by 15.

Mounted on the crank shaft 12 of the engine is a driving gear 16, said gear 16 being in mesh with a transmitting gear 17 by means of which the armature shaft 15 is operated from the crank shaft of the engine. The gears 16 and 17 are of the same diameter so that the armature shaft 15 will be operated at the same speed as the crank shaft.

The embodiment of the invention illustrated in Figs. 1 and 2 contemplates the association of the same with the governor mechanism by which the speed of the engine is controlled. The form of this speed-controlling mechanism is of a conventional type, including a weighted lever 18 fulcrumed on a supporting bolt 19, the latter being mounted in the transmitting gear wheel 17 and held therein by an enlarged neck 20 which contacts one face of the gear 17, the bolt 19 being of sufficient length to project at the opposite face of the wheel 17. At the projecting end of the bolt 19 the same is provided with a securing nut 21. Between the nut 21 and the adjacent face of the wheel 17 is disposed the weighted lever 18 so as to rock on the bolt 19, the degree and the direction of the rocking movement being induced by the speed of rotation of the wheel 17. At one end of the lever 18 is located a contact 22 which is designed to engage a collector ring 23, and by the engagement of the contact 22 with the ring 23, flow of the current is interrupted and the engine speed is reduced.

At the end of the lever 18 opposite to that at which the contact 22 is located an adjustable connection 24 is provided, a coil spring 25 being interposed between the connection 24 and a fixed stud 26 which passes through and is carried by the gear wheel 17 at a point substantially diametrically opposite to the supporting bolt 19. The spring 25 is tensioned by adjustment of the connection 24, so that its resistance to the outward throw of the weighted lever 18, induced by centrifugal force, may be varied.

The supporting bolt 19 affords a common means for attaching the ignition-controlling mechanism of the present invention to the transmitting gear wheel 17, and the enlarged neck 20 of the bolt 19 is utilized for this purpose. To this end, a weighted lever 27 is mounted on the neck 20, being held thereon between the wheel 17 and the head of the bolt 19. The lever 27 is free to rock on the neck 20. At one end of the lever 27 is arranged an adjustable screw 28, said screw passing through the lever 27, and having mounted on one of its ends an adjusting nut 29. At the opposite side of the lever 27 is a locking nut 30. When the screw 28 has been adjusted in proper relation to the lever 27 by the nut 29, the locking nut 30 is tightened against the lever 27, and thereby holds the screw 28 in the position to which it has been adjusted by the nut 29. This adjustment is for the purpose of varying the tension of a controlling spring 31 one end of which is connected to the screw 28, the other end of said spring being connected to the end of the stud 26 opposite to that to which the spring 25 of the speed-controlling mechanism is attached. The stud 26 is of sufficient length to project at both sides of the wheel 17. It thus affords anchorage points for the two springs 25 and 31. When the speed of the wheel 17 reaches a predetermined point the weighted lever 27 will be thrown outwardly by centrifugal force, against the pull of the spring 31, and in that movement of the lever it is rocked on the bolt 19, the reduction of speed of the wheel 17 permitting the spring 31 to assert itself and to pull the weighted lever 27 inwardly in an opposite direction to the movement of the lever 27 induced by centrifugal force. This swinging of the lever 27 is utilized for automatically controlling the timing of the spark of the engine. For this purpose the hub of the lever 27 which receives the supporting bolt 19 is provided with a crank arm 32, the latter projecting in angular relation to the weighted lever 27. The arm 32 carries an inwardly projecting pin 33 the free end of which is received by a notch 34 formed in a crank arm 35 which is carried by a bushing 36. This bushing 36 is fixedly connected to the armature shaft 15 by a key 37 so that the bushing 36 and the shaft 15 will move together. The bushing 36 is received by the hub of the gear wheel 17, and said wheel is free to rotate in a limited degree with respect to the bushing 36, this free connection between said wheel and said bushing permitting relative movement for a purpose presently to be explained.

Assuming the parts to be in the position illustrated in Figs. 1 and 2, the engine is at rest, and the spark is fully retarded. In this position of the parts the retarded position of the spark enables the engine to be started under the most advantageous conditions, and without premature explosion of the charge to cause backfiring and resultant damage or injury to the engine and its appurtenances. When the engine is started and its speed has attained a certain degree, the weighted lever 27 will be thrown outwardly against the pull of the spring 31. This outward movement of the lever 27 is limited by a pin 38, against which the lever 27 contacts when thrown outwardly, and thus limits the angle of advance of the spark. In that movement of the lever 27 the same is rocked on the supporting bolt 19, and this results in a forward shifting movement of the crank arm 32, or in the direction of rotation of the wheel 17. In such movement of the crank arm 32 the engagement of the stud 33 thereof with the slot 34 of the crank arm 35 will swing the latter also forwardly, thereby rotating the armature shaft 15 and gradually advancing the spark in accordance with the increasing speed of rotation of the wheel 17. The rotative movement just described is to be distinguished from the rotation of the shaft 15 resulting from the operation of the engine crank shaft and by which the armature shaft is continuously driven during operation of the engine. The rotative movement effected by the crank arms 32 and 35 is but limited, and is utilized merely to vary the angle of the advance of the spark. The advancing of the spark is thus synchronized with the increase of speed of the engine, and so long as the engine continues to operate to the maximum limit permitted by the speed-governing mechanism, the spark will remain advanced. When the speed-governing mechanism acts to reduce the speed of the engine, whereby the speed of the gear wheel 17 is reduced, the pull of the spring 31 will draw the weighted lever 27 inwardly, thereby rocking the same on the supporting bolt 19 in a direction opposite to the movement of the lever induced by centrifugal force, which action of the spring 31 acts to shift the crank arms 32 and 35 in a rearward direction, which movement, in turn, moves the armature shaft 15 from the advanced position of the spark to the retarded position thereof. The greater the reduction of the speed of the wheel 17, the greater the degree of retarding of the spark. When the wheel 17 comes to rest the spark is fully retarded. Thus, in the slowing down of the speed of the engine the spark is proportionally retarded, thereby precluding premature explosion of the charge, and preventing injury and damage to the engine and its appurtenant parts.

By associating the spark-controlling mechanism with the speed-controlling mechanism, in the manner illustrated in Figs. 1 and 2, a compact arrangement is provided, whereby these mechanisms are carried by the single gear wheel, being located at opposite sides thereof, and affording a convenient disposition of the parts with economy of space for their accommodation.

It will be understood that the herein described spark-controlling mechanism may be positioned upon the gear wheel 17, regardless of the absence from association with that wheel of the speed-controlling mechanism. An embodiment of the invention of that sort is illustrated in Fig. 3, the speed-controlling mechanism having been omitted.

In Figs. 4, 5 and 6 a further embodiment of the invention is shown. In this embodiment the spark-controlling mechanism is of the same construction as illustrated in Figs. 1, 2 and 3. It simplifies the embodiment of the speed-controlling and spark-controlling mechanisms illustrated in Figs. 1 and 2 by mounting the contact 22, which cooperates with the collector ring 23, on a supplemental crank arm 39. This crank arm 39 is carried by the weighted lever 27 at a point in proximity to the crank arm 32, and in the swinging of the weighted lever 27 on the supporting bolt 19 the contact 22 is caused to engage with and become disengaged from the collector ring 23.

In the embodiment of Figs. 4, 5 and 6 the controlling mechanisms are located at the inner side of the wheel 17, and thus positioned between the wheel and the magneto, and for the accommodation of the mechanisms at that side of the wheel, the latter is of dished construction, as indicated at 40.

I claim:

1. In a controlling mechanism of the class described, the combination with the shaft of a magneto, of a supporting gear associated with said shaft, a bushing fixed to said shaft and on which said supporting gear is mounted to permit relative movement between the bushing and said gear, connections for effecting rotation of said supporting gear and the magneto shaft in unison, and means for shifting the position of said bushing with respect to said supporting gear to vary the rotative relation of the shaft to said supporting gear, said means comprising a lever pivotally supported on said supporting gear and connected to said bushing, and thereby to vary the timing of the spark generated by the magneto, said gear being adapted for engagement with a driven gear of an engine.

2. In a controlling mechanism of the class described, the combination with the shaft of a magneto, of a supporting gear associated with said shaft, a bushing fixed to said shaft and on which said supporting gear is mounted to permit relative movement between the bushing and said gear, connections for effecting rotation of said supporting gear and the magneto shaft in unison, centrifugally-operating means for shifting the position of said bushing with respect to said supporting gear to vary the rotative relation of the shaft to said supporting gear, and thereby to vary the timing of the spark generated by the magneto, said means comprising a lever pivotally supported on said supporting gear and connected to said bushing, and means for restoring the normal relation of the shaft and said supporting gear, said gear being adapted for engagement with a driven gear of an engine.

3. In a controlling mechanism of the class described, the combination with the shaft of a magneto, of a supporting gear associated with said shaft, a bushing fixed to said shaft and on which said supporting gear is mounted to permit relative movement between the bushing and said gear, connections for effecting rotation of said supporting gear and the magneto shaft in unison, centrifugally-operating means for shifting the position of said bushing with respect to said supporting gear to vary the rotative relation of the shaft to said supporting gear, said means comprising a lever pivotally supported on said supporting element and connected to said bushing, and thereby to vary the timing of the spark generated by the magneto, and means for retracting the centrifugally-operating means on reduction of the speed of rotation of the shaft and said supporting gear to restore the normal relation of the shaft and said supporting gear, said gear being adapted for engagement with a driven gear of an engine.

4. In a control device of the character described, the combination with an armature shaft, a bushing mounted on the shaft and having a depending slotted lug, a gear mounted for relative rotation on the bushing, a common supporting stud passing through the gear and affording a pivot support, means for shifting the angular position of the bushing with respect to the gear, said means including a centrifugally operated lever and crank arm mounted on the pivot support and engaged within the slotted lug of the bushing to obtain relative movement responsive to the rotation of the gear.

5. In a mechanism of the character described, a driven shaft, a driven gear mounted for rotation with the driven shaft, a bushing fixed to the driven shaft and on which the driven gear is mounted to permit relative rotary movement between the bushing and gear, and centrifugal operating means supported by the driven gear for shifting angularly the postion of the bushing with respect to the driven gear, said means including a bell crank lever and a loose connection between said lever and bushing.

6. In a mechanism of the class described, a driven gear, a driven element upon which said driven gear is mounted for rotative movement relative thereto, a centrifugally operated weighted bell crank lever pivotally supported on the driven gear, and connecting means between the driven element and bell crank lever to vary the angular relation between the driven gear and driven element on movement of the bell crank lever.

7. In a mechanism of the class described, a driven gear, a driven element upon which said driven gear is mounted for rotative movement relative thereto, centrifugally operated weighted bell crank levers pivotally supported on the driven gear on opposite sides thereof, spring tension devices connected respectively between a portion of the gear and one end of each bell crank lever, a contact device at the free end of one of said bell crank levers, and a loose mechanical connection between the free end of the other bell crank lever and the driven element to control the relative angular position of the driven element and driven gear on movement of the lever.

8. In a controlling mechanism of the class described, a driven shaft of a magneto, a supporting gear associated with the driven shaft, a bushing carried by and fixed to the driven shaft and on which said supporting gear is mounted, to permit relative angular movement between the bushing and driving shaft and said supporting gear, a weighted bell crank lever pivotally mounted on the supporting gear and operating under centrifugal force for shifting angularly the position of said bushing and driven shaft with respect to the supporting gear, to vary the relative relation of the shaft to said supporting gear, and a pin and slot connection between said weighted lever and the bushing for effecting shifting of the latter when the weighted lever is operated.

9. In a controlling mechanism of the class described, a driven shaft of a magneto, a supporting gear associated with the driven shaft, a bushing carried by and fixed to the driven shaft and on which said supporting gear is mounted, to permit relative angular movement between the bushing and driving shaft and said supporting gear, a weighted bell crank lever pivotally mounted on the supporting gear and operating under centrifugal force for shifting angularly the position of said bushing with respect to said supporting gear to vary the rotative relation of the shaft to said supporting gear, a pin and slot connection between said bell crank lever and the bushing for effecting shifting of the latter when the bell crank lever is operated, and means for restoring the normal relation of the driven shaft and said supporting gear.

10. In a controlling mechanism of the class described, a driven shaft of a magneto, a supporting gear associated with the driven shaft, a bushing carried by and fixed to the driven shaft and on which said supporting gear is mounted, to permit relative angular movement between the bushing and driving shaft and said supporting gear, a weighted bell crank lever pivotally mounted on the supporting gear and operating under centrifugal force for shifting angularly the position of said bushing with respect to said supporting gear to vary the rotative relation of the shaft to said supporting gear, said bell crank lever having at one end two angularly spaced arms, a pin and slot connection between one of said arms and the bushing for effecting shifting of the latter when the bell crank lever is operated, a contact device mounted on the other of said arms for cooperation with a collector ring, and means for restoring the normal relation of the driven shaft and said supporting gear.

In testimony whereof I have hereunto subscribed my name this 31st, day of March, 1928.

LELAND G. KNAPP.

CERTIFICATE OF CORRECTION.

Patent No. 1,887,268.   November 8, 1932.

LELAND G. KNAPP.

It is hereby certified that error appears in the printed specification of the above numbered patent requiring correction as follows: Page 3, lines 100 to 104, claim 3, strike out the words "said means comprising a lever pivotally supported on said supporting element and connected to said bushing," and insert the same after "magneto," in line 105, of same claim; and that the said Letters Patent should be read with these corrections therein that the same may conform to the record of the case in the Patent Office.

Signed and sealed this 7th day of February, A. D. 1933.

M. J. Moore,
Acting Commissioner of Patents.

(Seal)